United States Patent
Meunier et al.

(10) Patent No.: US 7,042,391 B2
(45) Date of Patent: May 9, 2006

(54) MOBILE DEVICE AND METHOD FOR DETERMINING LOCATION OF MOBILE DEVICE

(75) Inventors: Jean-Luc Meunier, Saint Nazaire les Eymes (FR); Dave Snowdon, Grenoble (FR)

(73) Assignee: Xerox Corporation, Stamford, CT (US)

( * ) Notice: Subject to any disclaimer, the term of this patent is extended or adjusted under 35 U.S.C. 154(b) by 192 days.

(21) Appl. No.: 10/735,554

(22) Filed: Dec. 12, 2003

(65) Prior Publication Data

US 2005/0130677 A1 Jun. 16, 2005

(51) Int. Cl.
*G01S 1/00* (2006.01)
(52) U.S. Cl. .............................. 342/357.02; 455/456.1; 455/456.2; 455/456.5; 455/456.6; 455/414.1; 455/441; 342/357.13; 342/357.03; 342/357.04; 342/357.17
(58) Field of Classification Search .. 455/456.1–456.6, 455/414.2; 342/357.01, 357.02; 701/207
See application file for complete search history.

(56) References Cited

U.S. PATENT DOCUMENTS

| 5,590,043 | A | * | 12/1996 | McBurney .................... 701/207 |
| 5,900,838 | A | * | 5/1999 | Khan et al. ................... 342/457 |
| 6,052,598 | A | * | 4/2000 | Rudrapatna et al. ...... 455/456.1 |
| 6,148,211 | A | * | 11/2000 | Reed et al. ............... 455/456.2 |
| 6,535,815 | B1 | * | 3/2003 | Bloebaum .................... 701/213 |
| 6,839,560 | B1 | * | 1/2005 | Bahl et al. ................ 455/456.1 |
| 2001/0022558 | A1 | | 9/2001 | Karr, Jr. et al. | |
| 2002/0101375 | A1 | | 8/2002 | Stilp et al. | |
| 2003/0008671 | A1 | * | 1/2003 | Lundgren et al. ............ 455/456 |
| 2003/0229445 | A1 | * | 12/2003 | Tingley ....................... 701/207 |

(Continued)

FOREIGN PATENT DOCUMENTS

WO   WO 03/021851 A   3/2003

OTHER PUBLICATIONS

Paramvir Bahl and Venkata N. Padmanabhan, "Radar: An In-Building RF-based User Location and Tracking System", Infocom 2000, Nineteenth Annual Joint Conference of the IEEE Computer and Communications Societies. Proceedings. IEEE Tel Aviv, Israel, Mar. 26-30, 2000, pp. 775-784, vol. 2, Mar. 26, 2000.

(Continued)

*Primary Examiner*—William Trost
*Assistant Examiner*—Ariel Balaoing
(74) *Attorney, Agent, or Firm*—Jeannette Walder

(57) ABSTRACT

A mobile device, for determining location in a wireless network, includes a motion detector for detecting motion of the mobile device; a memory for storing wireless signal strength calibration data comprising a list of wireless signal strengths and known locations; a location detection module for measuring a wireless signal strength of any received network radio signals and for determining the location of the mobile device with reference to the wireless signal strength calibration data; and a location correction module, for applying a statistical correction to the measured wireless signal strength determined by the location detection module when the motion detector detects that the mobile device is moving less than a threshold amount. The mobile device may further include an orientation detector for detecting the orientation of the mobile device, which can be compared with orientation data stored in the calibration data.

10 Claims, 2 Drawing Sheets

U.S. PATENT DOCUMENTS

2005/0096841 A1* 5/2005 Gedik et al. ................ 701/207

OTHER PUBLICATIONS

Paul Castro, Patrick Chiu, Ted Kremenek, and Richard Muntz, "A Probabilistic Room Location Service for Wireless Networked Environments", UBICOMP—UCLA Department of Computer Science, 2001, pp. 18-34.

Paramvir Bahl, Venkata N. Padmanabhan, "Radar: An In-Building RF-based User Location and Tracking System", Proc. IEEE Infocom 2000.

Paul Castro, Patrick Chiu, Ted Kremenek, Richard Muntz, "A Probabilistic Room Location Service for Wireless Networked Environments", UbiComp 2001, pp. 18-34.

* cited by examiner

✓ Possible Location    ✗ Invalid Location

MOBILE DEVICE AND METHOD FOR DETERMINING LOCATION OF MOBILE DEVICE

FIELD OF THE INVENTION

This invention relates generally to a method for determining the proximity of mobile devices in a wireless network

BACKGROUND OF THE INVENTION

The use of a wireless local-area network to detect the location of a device within the area covered by the network (the "WiFi triangulation method") is advantageous because it permits devices to be located without the need to install additional hardware either in the environment or on the device being located. The WIFI triangulation method relies on characterizing each place by the received signal strength of the wireless access points that cover an area. A calibration phase is first done to record the values of the signal strength throughout the area in which devices are intended to be tracked. After the calibration phase the values of the access point signal strengths are used to find the most probable device location. In one implementation, the wireless triangulation location method compares measured wireless signal strength to a table of wireless signal strengths and known locations, finds the table entry with the closest signal strength to the measured signal strength and determines its location by reference to the found table entry.

However, the WiFi triangulation method suffers from the disadvantage that the signal strength not only changes as a function of location, but also changes due to many other factors, for example, changes in the environment (such as movement of people or large objects). These changes in the signal strength result in an inherent unreliability of the detected location; this problem may be referred to as the stability problem. In addition, the orientation of the mobile device can affect the signal strength received, meaning that the same location can result in several different levels of signal strength depending on the direction the device is facing; this problem may be referred to as the orientation problem.

One technique for improving reliability is to use a statistical process to find the most probable location based on a series of samples from the location algorithm, however this technique will perform badly if the user is moving, since there are actual changes in location as opposed to transient errors in location detection. Two other techniques, RADAR (P. Bahl and V. Padmanabhan, "RADAR: An In-Building RF-Based User Location and Tracking System," Proc. IEEE Infocom 2000) and NIBBLE (P. Castro, P. Chiu, T. Kremenek, R. Muntz, "A Probabilistic Room Location Service for Wireless Networked Environments", UbiComp 2001), implement systems for calculating the location of a mobile device based on signal strength information. In addition RADAR makes use of a fixed client to attempt to detect and compensate for overall variations in signal strength, however, this approach can only detect signal strength variations in the vicinity of the fixed client(s) which may not be representative of changes in other locations.

What is needed is a method of determining location using a WiFi network which minimizes or alleviates the stability problem. What is needed is a method of determining location using a WiFi network which minimizes or alleviates the orientation problem.

SUMMARY OF THE INVENTION

Wireless LANs can be used not only for communication but also for determining location of mobile devices by analyzing the signal strengths from multiple fixed base stations. This is advantageous because no additional hardware must be deployed in the environment and the mobile devices whose locations are measured need only have a wireless network card. However, this location method is inherently unreliable due to continuous variations in the network signal strength due to environmental factors (caused, for example, by people moving around the building). A mobile device which overcomes these problems, according to one aspect of the invention, includes a motion detector (such as an accelerometer) for detecting motion of the mobile device; a memory for storing wireless signal strength calibration data comprising a list of wireless signal strengths and known locations; a location detection module for measuring a wireless signal strength of any received network radio signals and for determining the location of the mobile device with reference to the wireless signal strength calibration data; and a location correction module, for applying a statistical correction to the measured wireless signal strength determined by the location detection module when the motion detector detects that the mobile device is moving less than a threshold amount.

Various statistical correction algorithms may be used. One exemplary algorithm includes calculating from a moving window of N signal strength samples, wherein M samples of the N samples have a measured signal strength above a predetermined value, from a minimum of X wireless base stations, an average value and standard deviation of the signal strength for each of the X wireless base stations. If the motion detector is capable of detecting direction of motion or velocity of motion, the location detection module, responsive to the detected direction of motion, may predict the mobile device's next location.

A method for determining a location of a mobile device, according to another aspect of the invention, includes measuring a wireless signal strength of any received network radio signals; detecting motion of the mobile device; applying a statistical correction to the measured wireless signal strength when the mobile device is moving less than a threshold amount; and determining the location of the mobile device with reference to wireless signal strength calibration data comprising a list of wireless signal strengths and known locations.

A mobile device, according to another aspect of the invention, includes an orientation detector (such as an electric compass) for determining orientation of the mobile device; a memory for storing wireless signal strength and orientation calibration data comprising a list of wireless signal strengths, orientations and known locations; and a location detection module for measuring a wireless signal strength and responsive to orientation of the mobile device, for determining the location of the mobile device with reference to the wireless signal strength and orientation calibration data.

DETAILED DESCRIPTION OF THE EMBODIMENTS

Figure 1:
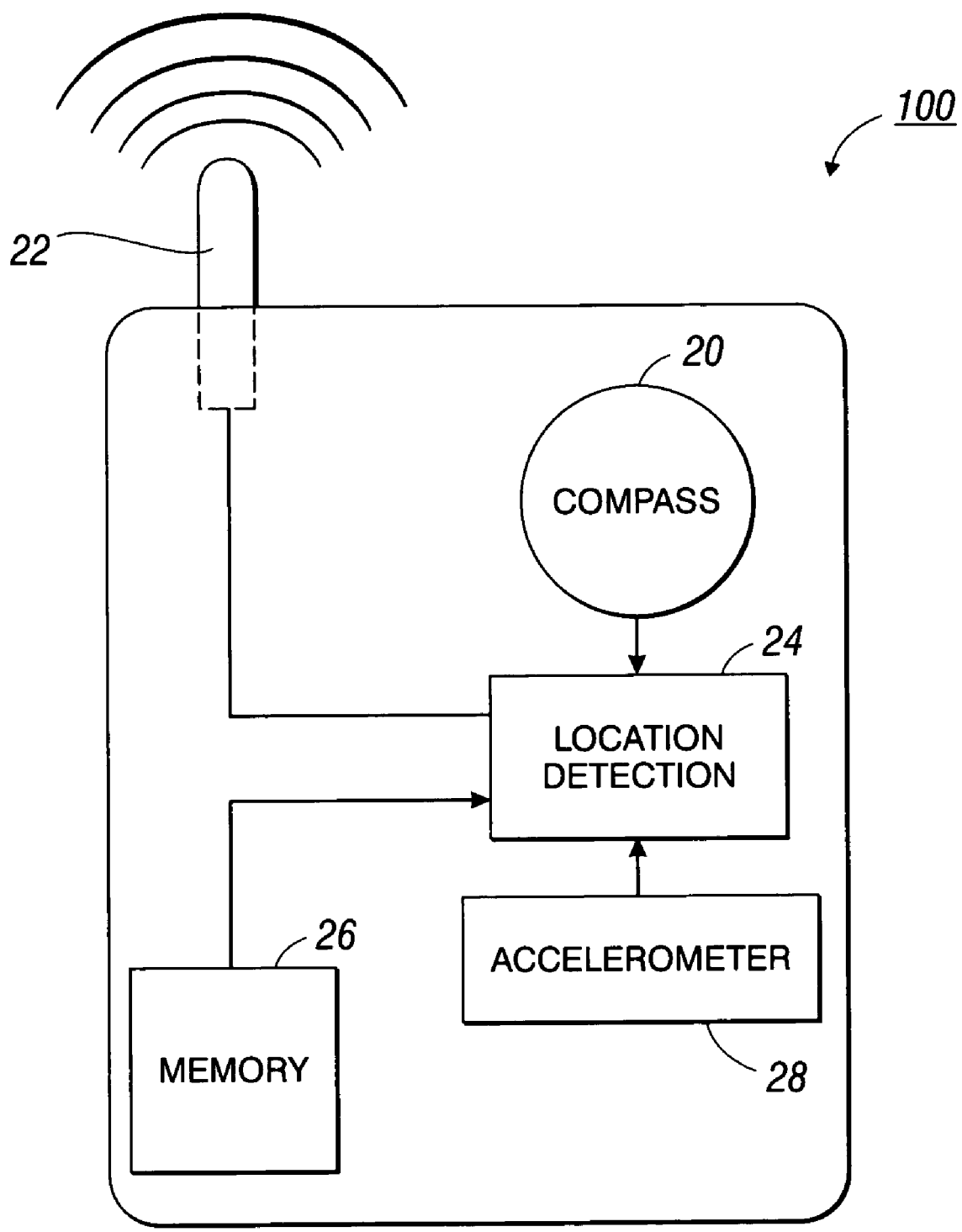
FIG. 1 is a block diagram of a mobile device for determining location.

We present solutions to both the stability problem and the orientation problem by adding inexpensive sensors to a mobile device. Referring to FIG. 1, mobile device 100 (which may be a cell phone, a personal digital assistant or other mobile device) includes a location detection module for determining the mobile device's location. A motion detector, such as accelerometer 28 detects if the mobile device 100 is moving, and provides this information to location detection module 24. Compass 20 detects the orientation of the mobile device 100 and provides this information to location detection module 24. Location detection module receives network radio signals from wireless base stations transmitting in the area through antenna 22 and measures their signal strength. The signal strength information is compared with calibration data stored in memory 26. Calibration data includes a list of signal strength and location information. Calibration data may also include orientation information, that is, the orientation of the particular signal strength values stored.

Stability. Determination of location using stored calibration data is inherently unstable due to changes in environmental conditions that mobile device users have no control over. Since mobile users have no control over environmental factors it is difficult to achieve large improvements in the reliability of the raw location information derived from a comparison of measured signal strength against the signal strengths recorded during a calibration phase. Performance can be improved by changing how the raw signal strength measurements is used, in particular, by processing the raw location information based on additional information. In particular mobile device 100 employs a motion detector (which in this case is an accelerometer) to detect movement of the mobile device. Other sensors which can detect movement could also be used. There are (at least) two ways in which to use the movement sensor.

In this method we are concerned only with whether the mobile device is moving more than a certain amount (some predetermined threshold) or not. We assume that a handheld device will often be moving slightly due to inadvertent movements (such as fidgeting) of the user and so we define a cut off threshold below which we ignore small movements. The motion sensor may in this implementation be only concerned with emitting a Boolean value indicating if movement above the threshold is taking place or not. This may allow us to use less expensive, but less sensitive, sensors than might be required for more fine grain movement detection.

The Boolean value from the motion detector 28 is used to determine the manner in which the raw location information is treated by the location detection module. In the first instance, the mobile device is not moving. If the device is not moving, we can apply various statistical algorithms to attempt to detect and remove erroneous location guesses knowing that the real position of the mobile device has not changed. Once the system has stabilized there is no need to resample the location (or it can be sampled at a lower frequency) until movement is detected.

One exemplary statistical algorithm is to use a moving window of the last N signal strength samples. If at least M samples within the window are of sufficient quality (signal received from a minimum X number of wireless base stations) then the average value and standard deviation of the signal strength is computed for each base station. Samples further than Y times the standard deviation from the average are discarded and the remaining samples are used to compute a new average. This, and similar techniques may improve accuracy of the location detection if the user is stationary long enough for several samples to be taken at that location. However, if the user is moving then the results of this process will likely be worse than guessing location based on the instantaneous signal strength.

In the case of the simple binary motion detector, if the user is moving we fall back to guessing location based solely on the instantaneous signal strength.

Figure 2:
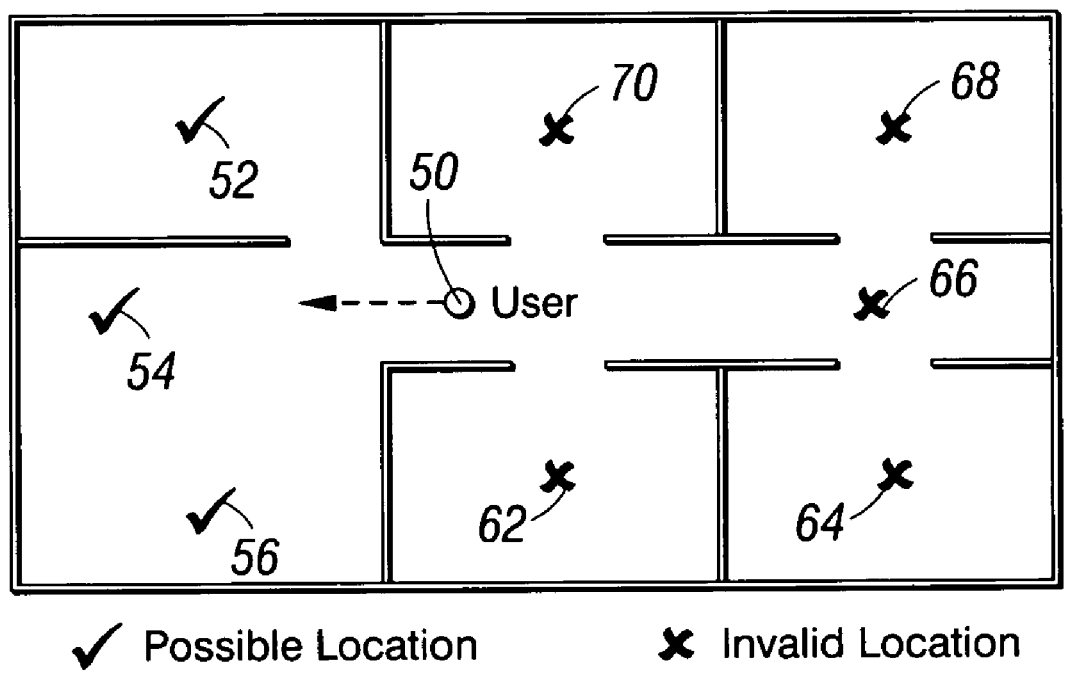
FIG. 2 illustrates detection of a mobile device's future location.

If motion detector 28 is a more advanced detector, for example, if detector 28 is capable of detecting the direction of the movement and optionally the velocity or acceleration in that direction, additional information can be determined. If the mobile device 100 is stationary (within the specified threshold) then the same approach is used as above. If the mobile device 100 is moving, then there are several strategies that could be exploited to improve accuracy of the location system if there is some basic knowledge of the topology of the surround space. For example, the next location of the mobile device may be predicted using direction, velocity and previous location(s). If the prediction is ambiguous then the results of the prediction algorithm can be used to validate the results from the wireless network location guesser. Predicted locations that do not lie on the direction of travel may be rejected. FIG. 2 illustrates use of direction, information to filter potential locations returned by the location guesser. Referring to FIG. 2, user 50 is located in the hallway of a building in which there are 6 possible locations. The motion detector detects that the user 50 is moving to the west. Possible future locations are indicated by a check mark. Note that user 50 may be in one of location 52, 54 or 56. Possible locations 62, 64, 66, 68 and 70 may be rejected because they do not lie in the direction of travel.

Orientation. The difference in signal strength due to the orientation of the mobile device causes two problems. First, during calibration the signal strength must be captured at several orientations. This is time consuming but possible and the calibration software could guide the user by prompting him/her to turn through the points of the compass and for each location to take readings at north, east, south, west for example. Second, during use (location guessing) the orientation of the device may affect the received signal strength. If there is a considerable variation between orientations (which has been seen in practice) then there may be some ambiguity between locations.

These issues can be addressed by augmenting the mobile device 100 with an orientation detector, such as an electronic compass 20. Electric compasses can be very small and so would not appreciably increase the size or weight of the mobile device 100. The addition of such a sensor would have the following advantages. If the mobile device is used to perform calibration, the electric compass would provide automatic labeling of direction information during calibration. During use (i.e., location determination of the mobile device) the accuracy of the guessed locations could be improved by first considering only recorded signal strengths taken at the same orientation and then if no good match is found, to widen the search to consider other orientations (this could be useful if not all locations were calibrated in all directions). This would speed up the location guesser since there would be few signal strength tuples to consider and also improve accuracy since locations with similar signal strengths could be eliminated if the similarity only occurred for different orientations. For example if point A north has the same signal strength characteristics as point B east then this would not be a problem since point B east would not be considered when the device was facing north.

The mobile device and method of the invention addresses the problems of variations in network signal strength. The addition of small low cost motion detectors (such as accelerometers) and electric compasses to the mobile device should not appreciably increase the mobile device's size, price or power consumption. In contrast to prior art approaches, which rely on the use of a second client to adapt to changes in signal strength, our approach relies on capturing more information about the status of the client and using that to improve the location estimates from the location system. The following advantages may be achieved: all information is local—the sensors are read directly by the mobile device and so, unlike with the RADAR approach, no communication to another client is required; our approach does not assume that variations experienced by one client are the same as those experienced by another client at a potentially different location; by using orientation data we can handle the potentially large variations in signal strength due to orientation—neither of the prior art approaches accomplish this. Our approach provides a simple and inexpensive extension to existing wireless networks, involving adding sensors (e.g., motion sensors, accelerometers) to provide additional input to the localization algorithm, and allowing the devices to predict future locations based on current movement, direction, or lack thereof. This approach has the advantage that no additional infrastructure must be added to the environment and that devices without these additional sensors can still make use of the location system, albeit at a reduced performance.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A mobile device, comprising:
   a motion detector for detecting motion of the mobile device, wherein the motion detector generates a Boolean value indicating the mobile device is moving if the detected motion is greater than a threshold amount;
   an orientation detector for determining orientation of the mobile device;
   a memory storing wireless signal strength calibration data comprising a list of wireless signal strength, orientations and known locations;
   an antenna for receiving network radio signals from wireless base stations transmitting in an area;
   a location detection module for measuring a wireless signal strength of any received network radio signals from the antenna and for determining the location of the mobile device using measured wireless signal strength with reference to the wireless signal strength calibration data, motion detection data and orientation data, wherein if the mobile device is moving, the location detection module determines location of the mobile device with reference to instantaneous wireless signal strength; and
   wherein if the mobile device is not moving, the location detection module determines location of the mobile device with reference to statistically corrected measured wireless signal strength received from a location correction module, for applying a statistical correction to the measured wireless signal strength received by the location detection module;
   wherein the location module first considers measured wireless signal strengths taking at the same orientation as determined by the orientation detector for determining location of the mobile device and if no location is determined considers measured wireless signal strengths at other orientations.

2. The mobile device of claim 1, wherein the statistical correction comprises calculating from a moving window of N signal strength samples, wherein M samples of the N samples have a measured signal strength above a predetermined value, from a minimum of X wireless base stations, an average value and standard deviation of the signal strength for each of the X wireless base stations.

3. The mobile device of claim 1, wherein the motion detector detects direction of motion; and
   wherein the location detection module, responsive to the detected direction of motion, predicts the mobile device's next location.

4. The mobile device of claim 3, wherein the motion detector detects velocity of the mobile device; and
   wherein the location detection module, responsive to the detected velocity of motion, predicts the mobile device's next location.

5. The mobile device of claim 3, wherein the location detection module rejects locations not in the direction of motion.

6. A method for determining a location of a mobile device, comprising:
   storing wireless signal strength calibration data comprising a list of wireless signal strengths, orientations and known locations;
   receiving network radio signals from wireless base stations transmitting in an area;
   measuring a wireless signal strength of any received network radio signals;
   detecting motion of the mobile device, wherein a Boolean value indicating the mobile device is moving is generated if the detected motion is greater than a threshold amount;
   determining orientation of the mobile device;
   determining the location of the mobile device using measured wireless signal strength with reference to the wireless signal strength calibration data, motion detection data and orientation data;
      wherein if the mobile device is moving, determining location of the mobile device with reference to instantaneous wireless signal strength; and
      wherein if the mobile device is not moving, applying a statistical correction to the measured wireless signal strength and determining location of the mobile device with reference to statistically corrected measured wireless signal strength;
   considering measured wireless signal strengths taken at the same orientation as the determined orientation and if no location is determined considering measured wireless signal strengths at other orientations.

7. The method of claim 6, wherein the step of applying a statistical correction comprises calculating from a moving window of N signal strength samples, wherein M samples of the N samples have a measured signal strength above a predetermined value, from a minimum of X wireless base stations, an average value and standard deviation of the signal strength for each of the X wireless base stations.

8. The method of claim 6, further comprising detecting direction of motion of the mobile device; and responsive to the detected direction of motion, predicting the mobile device's next location.

9. The method of claim 8, further comprising detecting velocity of the mobile device; and responsive to the detected velocity of motion, predicting the mobile device's next location.

10. The method of claim 8, further comprising rejecting locations not in the direction of motion.

* * * * *